«12» United States Patent
Steinruecken et al.

(10) Patent No.: US 7,661,297 B2
(45) Date of Patent: Feb. 16, 2010

(54) METHOD AND SYSTEM FOR MAKING AVAILABLE AN IMPROVED PHASE SIGNAL OF A PHASE SENSOR ON A CAMSHAFT OF AN INTERNAL COMBUSTION ENGINE

(75) Inventors: Heinrich Steinruecken, Ludwigsburg (DE); Klaus Walter, Bietigheim-Bissingen (DE); Rasmus Rettig, Gerlingen (DE); Klemens Gintner, Ettlingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 11/597,803

(22) PCT Filed: Jun. 21, 2004

(86) PCT No.: PCT/EP2004/006686

§ 371 (c)(1),
(2), (4) Date: Nov. 16, 2007

(87) PCT Pub. No.: WO2005/119041

PCT Pub. Date: Dec. 15, 2005

(65) Prior Publication Data

US 2008/0210021 A1 Sep. 4, 2008

(30) Foreign Application Priority Data

May 27, 2004 (WO) ................ PCT/EP2004/005747
Jun. 17, 2004 (WO) ................ PCT/EP2004/006554

(51) Int. Cl.
*G01M 15/06* (2006.01)

(52) U.S. Cl. .................................................. 73/114.27
(58) Field of Classification Search ............. 73/114.02, 73/114.03, 114.04, 114.05, 114.24, 114.25, 73/114.26, 114.27, 114.28
See application file for complete search history.

(56) References Cited

U.S. PATENT DOCUMENTS

| 5,417,187 | A | 5/1995 | Schneider et al. |
| 5,692,488 | A | 12/1997 | Schmitz et al. |
| 2003/0000498 | A1 | 1/2003 | Mathews et al. |

FOREIGN PATENT DOCUMENTS

| DE | 41 41 713 | 6/1993 |
| DE | 43 10 460 | 10/1994 |
| EP | 0017933 | 10/1980 |
| JP | 3099625 | 8/2000 |
| JP | 2001-082194 | 3/2001 |
| JP | 2001263152 | 9/2001 |
| JP | 2003247856 | 9/2003 |

*Primary Examiner*—Eric S McCall
(74) *Attorney, Agent, or Firm*—Kenyon & Kenyon LLP

(57) ABSTRACT

A method and system for making available an improved phase signal of a phase sensor on a camshaft of an internal combustion engine immediately after switching on the phase sensor and/or the internal combustion engine are provided. In this context, the phase sensor scans the angle marks of a signal-generating wheel that is connected to the camshaft in a torsionally fixed manner. In addition, a crankshaft sensor scans the angle marks of a signal-generating wheel that is connected to the crankshaft in a torsionally fixed manner.

20 Claims, 6 Drawing Sheets

| ADAPTION | | MEMORY | | CORRECTION | | | |
|---|---|---|---|---|---|---|---|
| nFW | NW (°) | Δα | KOW | nFW | NW (°) | KOW | $NW_{KOR}$(°) |
| 1 | 59,5 | 2,5 | 2,5 | 1 | 59,5 | 2,5 | 57 |
| 2 | 59,5 | 2,5 | 2,5 | 2 | 59,5 | 2,5 | 57 |
| 3 | 59,5 | 2,5 | 2,5 | 3 | 59,5 | 2,5 | 57 |
| 4 | 59,25 | 2,25 | 2,25 | 4 | 59,25 | 2,25 | 57 |
| 5 | 59 | 2 | 2 | 5 | 59 | 2 | 57 |
| 6 | 58,75 | 1,75 | 1,75 | 6 | 58,75 | 1,75 | 57 |
| 7 | 58,5 | 1,5 | 1,5 | 7 | 58,5 | 1,5 | 57 |
| 8 | 58,25 | 1,25 | 1,25 | 8 | 58,25 | 1,25 | 57 |
| 9 | 58 | 1 | 1 | 9 | 58 | 1 | 57 |
| 10 | 57,75 | 0,75 | 0,75 | 10 | 57,75 | 0,75 | 57 |
| 11 | 57,5 | 0,5 | 0,5 | 11 | 57,5 | 0,5 | 57 |
| 12 | 57,25 | 0,25 | 0,25 | 12 | 57,25 | 0,25 | 57 |
| 13 | 57 | 0 | 0 | 13 | 57 | 0 | 57 |
| 14 | 57 | 0 | 0 | 14 | 57 | 0 | 57 |
| 15 | 57 | 0 | 0 | 15 | 57 | 0 | 57 |
| 16 | 57 | 0 | 0 | 16 | 57 | 0 | 57 |
| ... | 57 | 0 | 0 | ... | 57 | 0 | 57 |

Fig. 7

METHOD AND SYSTEM FOR MAKING AVAILABLE AN IMPROVED PHASE SIGNAL OF A PHASE SENSOR ON A CAMSHAFT OF AN INTERNAL COMBUSTION ENGINE

FIELD OF INVENTION

The present invention relates to a method for making available an improved phase signal of a phase sensor at a camshaft of an internal combustion engine immediately after switching on the phase sensor and/or the internal combustion engine.

BACKGROUND INFORMATION

In multi-cylinder internal combustion engines having electronic injection, it is usually calculated in the engine control unit when and how much fuel is to be injected per cylinder, and when the optimal ignition point will occur. In order for these calculations to be able to be carried out correctly, the respective setting of the crankshaft and the camshaft have to be known. In published European patent document EP 0017933, for example, it is described that the crankshaft and camshaft are each connected to a disk on whose surface at least one reference mark has been applied, and on the crankshaft disk, in addition, a plurality of similar markings, also known as increments, have been applied.

The two rotating disks are scanned by stationary sensors. From the sequence in time of the signals supplied by the sensors in the form of pulses, one may gather a single-valued statement concerning the setting of the crankshaft and the camshaft, and appropriate control signals may be formed in the engine control unit for injection or ignition.

From published German patent document DE 41 41 713, it is known that one may provide a signal-generating wheel at the camshaft, in addition to the one at the crankshaft which has a disk having a plurality of markings and having a bench mark or reference mark formed by two missing markings. This signal-generating wheel at the camshaft has markings of different lengths, adjusted to the number of cylinders, which the phase signal of the phase sensor reproduces. The phase signal of the phase sensor is drawn upon for cylinder identification.

From published German patent document DE 43 10 460, it is known that one may carry out the synchronization of the engine control unit via specially developed camshaft signal-generating wheels, which permit a rapid synchronization using counting of the segment lengths based on the crankshaft signal.

SUMMARY

The method according to the present invention has the advantage that an improved phase signal of the phase sensor is available after a renewed switching on of the phase sensor or after a renewed start of the internal combustion engine. This is achieved as follows:

a) After the first switching on of the phase sensor or the internal combustion engine, one proceeds as follows:

a.1) Ascertaining the start-up signal position of the phase signal during a calibrating procedure of the phase sensor, based on the crankshaft signal over several angle marks of the signal-forming wheel of the camshaft, during the calibrating procedure of the phase signal, a correction by adjustment values being made stepwise until a predefined setpoint signal position or a normal signal position has been achieved.

a.2) Ascertaining the normal signal position of the phase signal based on the crankshaft signal after the startup of the internal combustion engine, and based on the completed calibrating procedure in the phase signal generator.

a.3) Determining angle errors from the difference between the startup signal position and the normal signal position.

a.4) Storing the correcting values based on the angle errors in a nonvolatile memory, e.g., in the engine control unit.

b) During renewed switching on of the phase sensor or the internal combustion engine:

b.1) Correcting the phase signal recorded by the engine control unit during the calibration procedure of the phase signal generator by the correcting values particularly stored in the engine control unit, so that, after the renewed switching on, an improved phase signal is available.

Because of the nonvolatile storing of the correcting values, when there is a renewed start of the internal combustion engine, the correcting values are immediately available. The requirements for an accurate signal of the phase sensor are increasing, especially during the start of the internal combustion engine. An accurate angular position of the phase signal with respect to the crankshaft signal immediately after the start of the internal combustion engine leads to an improved and optimized control of the injection, ignition and angular camshaft control systems, which, in the last analysis, leads to a better exhaust gas behavior of the internal combustion engine in startup operation.

It has been shown that the deviation of the startup signal position of the phase signal based on the crankshaft signal from the normal signal position is based particularly on the following parameters: the air gap between the signal-forming wheel at the camshaft and the phase sensor, the temperature and rotational speed of the camshaft/crankshaft. In this context, the air gap has a particularly great influence and it depends on installation circumstances which may be different from one internal combustion engine to the next. Because of the method according to the present invention, the influence of the air gap may be corrected during a renewed switching on of the phase sensor or the internal combustion engine.

The method according to the present invention may be carried out when the crankshaft and the camshaft are running in synchronized fashion. Ideally, the correcting of the phase signal takes place according to above-noted step b.1) in such a way that, during the calibrating procedure, the corrected phase signal based on the crankshaft signal yields a corrected startup signal position which is essentially equivalent to the normal signal position.

In this context, the calibrating procedure or the adjustment during the calibrating procedure is not an active action starting from the engine control unit. The engine control unit is not able to influence this "adjustment." The change in the signal position of the phase signal is exclusively a function of the calibrating procedure running in the phase sensor.

According to the present invention, it may be provided that the setpoint signal position or the normal signal position is achieved, according to above-noted step a.1), if the phase signal is based on a switching threshold of the phase sensor which lies in the range of a certain percentage of the maximum signal recorded by the phase sensor. The phase sensor used has a switch-on switching threshold, in this context, which is close to a comparatively low input signal of the sensor. This is required in order also to make possible an immediate switching of sensors after the switching on, in which a comparatively large air gap is present between the sensor and the angle mark of the signal-forming wheel. Since the air gap may be different depending on installation, it is provided that the phase sensor calibrates itself. In this context, the switching threshold is shifted step by step in a range depending on the maximum input signal level swing. It has been shown that, at approximately 70% of the maximum analogous signal level swing recorded by the sensor, there is a favorable switching threshold. As a result, during the calibrating procedure, the preset switching threshold of the sensor is shifted step by step to a value of approximately. 70% of the maximum detected value. If the switching threshold achieves the predefined value, the setpoint signal position or the normal signal position is achieved. The calibrating procedure is then terminated. The duration of the calibrating procedure, in this context, depends on the size of the air gap.

The calibrating procedure takes place during the startup of the internal combustion engine. The startup of the internal combustion engine is terminated after eight working cycles, for example. Advantageously, the calibrating procedure is then terminated at the latest also after eight working cycles, but it may also be terminated earlier, depending on the size of the air gap. This achieves that the startup signal position is brought in small steps to the normal signal position, which avoids undesired signal deviations that are too great. This results in a stable and systematic behavior.

A method according to the present invention provides that the correcting values are formed from a maximum angle error at the first scanned angle mark and from additional angle errors at additional scanned angle marks corrected by the adjustment values. In this context, the correcting values may correspond to the respective angle errors. However, the correcting values may also be values dependent on the angle errors, for instance, values corrected for temperature or rotational speed. Instead of the angle errors, values that are characteristic of the angle errors may also be used, for instance, it is conceivable that one might use straight lines based on the angle errors or approximated to the angle errors.

One method according to the present invention provides that, during multiple renewed switching on of the phase sensor or the internal combustion engine according to above-noted step b.1), the corrected startup signal position is compared to the startup signal position to be expected based on the already stored correcting values, and, in response to repeating the switching on several times, an average value formation, in particular, a moving average formation of the correcting values to be stored according to step a.4) takes place. With each renewed switching on of the phase sensor or the internal combustion engine, the correcting values are accordingly stored, adjusted and learned. The correcting values to be used upon the renewed switching on of the phase sensor or of the internal combustion engine are accordingly optimized by the respective average formation.

In particular, the angle marks on the signal-producing wheel of the camshaft may be designed as edges of segments for generating high-phase and low-phase signals. In particular, four segments may be provided which in each case have one positive and one negative edge. This makes possible a singular assignment of the rotational setting of the signal-producing wheel of the camshaft within one working cycle. It is then possible to determine the angle errors based on the deviation of the startup edge position from the normal edge position. In this context, only the negative or positive edges can be taken into consideration. Knowing the absolute position of these edges, such as at a separation of 90° NW (camshaft), the actual phase position may be determined at each edge.

As has already been discussed, it may be advantageous to carry out the adjustment during the calibration procedure in several small steps. In this context, the adjustment between two edges may be restricted to a maximum value, this maximum value being in the range of $\pm 2°$ and $\pm 0.1°$, e.g., in the range of $\pm 0.2°$ to $\cong 0.75°$, and especially in the range of $\pm 0.25°$. In particular, the range of $\cong 0.25°$ has proven to be advantageous. If a difference of the startup edge position from the normal edge position of, for instance, 2.5° at the camshaft is to be corrected, this may take place over ten to fourteen negative or positive edge changes during a maximum adjustment of 0.25° between two edge changes. Typically, four negative edge changes are provided per working cycle; one adjustment is then made over three to four working cycles.

Storing the correcting values in a nonvolatile memory may take place in the engine control unit. The nonvolatile memory may, for example, be a permanent RAM memory, e.g., an EEPROM or a flash memory.

One example embodiment of the present invention provides that the correcting values are portrayed by a straight line that approximates the angle errors. This saves storage space, since it is not necessary to file a respective correcting value for each edge change in the nonvolatile memory. The straight line may, for instance, be specified by a linear regression or by two selected value pairs. This being the case, it is sufficient to keep only the two specified values in the nonvolatile memory. For the plausibility check of the respective values, additional mechanisms may also be used which, for instance, check admissible ranges of the values.

Advantageously, the adjustment and correction take place under specified conditions of the camshaft. In an angular camshaft control, this adjustment is taken into consideration.

Furthermore, the adjustment is made only if there are no detectable system interferences.

Another example embodiment of the present invention provides that a comparison is made of the ascertained angle errors or correcting values to the behavior that is typical for the phase sensor for the various air gaps. The air gap to be encountered at the respective engine specimen may then be ascertained by making a correlation of the two values. Thereby further air gap dependencies may be compensated for. Furthermore, from this, corresponding diagnosis functions and/or correcting functions are set up or supported. Because of this, based on the angle errors or correcting values, for example, it may be concluded that there is too big an air gap and corresponding suggestions may be given, for instance, at the end of the production line or in the service garage concerning an installation that was not performed according to the rules.

The present invention also provides a system for carrying out the method according to the present invention, an engine control unit for carrying out the method according to the present invention, as well as a computer program for such an engine control unit.

BRIEF DESCRIPTION OF THE DRAWINGS

FIG. 7 shows a table of values used in the adjustment procedure, the memory procedure and the correcting procedure.

DETAILED DESCRIPTION

Figure 1:
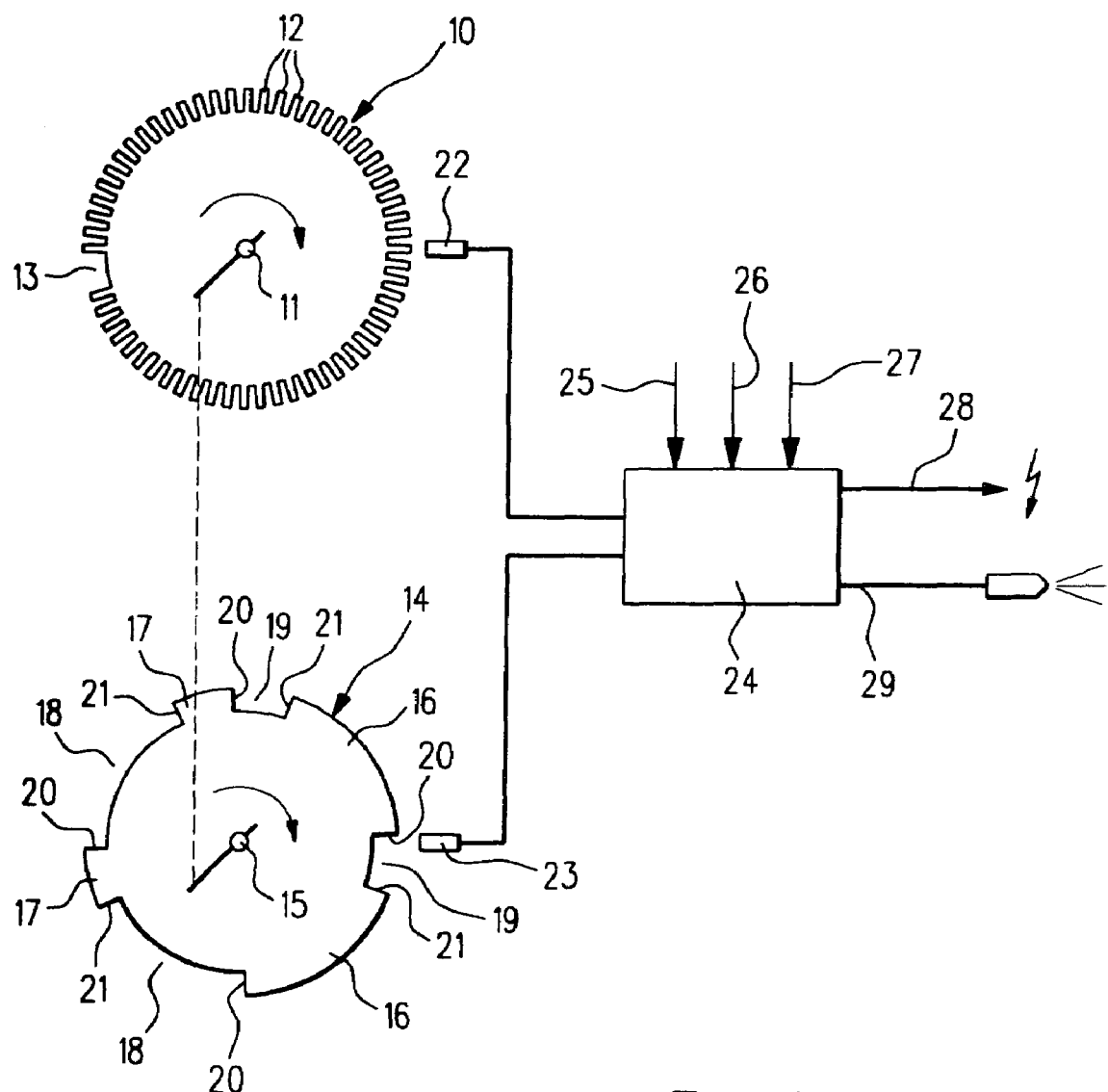
FIG. 1 is a schematic illustration of the system of the crankshaft and the camshaft along with the appertaining sensors and the engine control unit in which the calculations take place for the control of the injection and the ignition of the method according to the present invention.

FIG. 1 shows an overall view of the elements of the present invention in connection with an internal combustion engine, including an engine control unit.

In FIG. 1, 10 designates a signal-generating wheel which is rigidly connected to crankshaft 11 of the internal combustion engine and has a plurality of similar angle marks 12 at its circumference. Besides these similar angle marks 12, a reference mark 13 is provided which is formed, for instance, by two missing angle marks. Usually, altogether 60-2 angle marks are provided over the entire circumference of 360°.

A second signal-generating wheel 14 is connected to camshaft 15 of the internal combustion engine and has at its circumference segments of different lengths, the shorter segments being designated as 17 and the longer segments are designated as 16. Between the angle marks or segments interstices are provided, the longer ones bearing reference numeral 18 and the shorter ones bearing reference numeral 19. Each segment 16, 17 is bordered by a positive edge 20 and a negative edge 21.

Signal-forming wheel 14 shown in FIG. 1 is suitable for an internal combustion engine, and the number of segments 16, 17 is selected in such a way as to permit a clear synchronization within each segment with the reference signal at the crankshaft. This system is used for internal combustion engines having 4, 5, 6, 8 or more cylinders. The exact positioning of the angle marks, as well as the assignment of segments 16, 17 to the marks of signal-generating wheel 10 of crankshaft 11 should be performed in such a way that the signal patterns shown in FIG. 2 are obtained.

Signal-generating wheel 10 of crankshaft 11 is recorded by a crankshaft sensor 22, and that of signal-generating wheel 14 of camshaft 15 by a phase sensor 23. Sensor 22 may be, for example, an inductive sensor or Hall sensor, which generate signals as the angle marks run by them. Sensor 23 is an active sensor, such as a Hall sensor, which has the calibration behavior described above. The signals generated are supplied to engine control unit 24, and processed further there.

Via inputs 25, 26 and 27, engine control 24 receives additional input variables required for the control of the internal combustion engine, which are supplied by suitable sensors. At the output end, engine control 24 makes available signals for the ignition, injection and camshaft control for components of the internal combustion engine not described in greater detail; the outputs of engine control 24 are marked 28 and 29.

Figure 2:
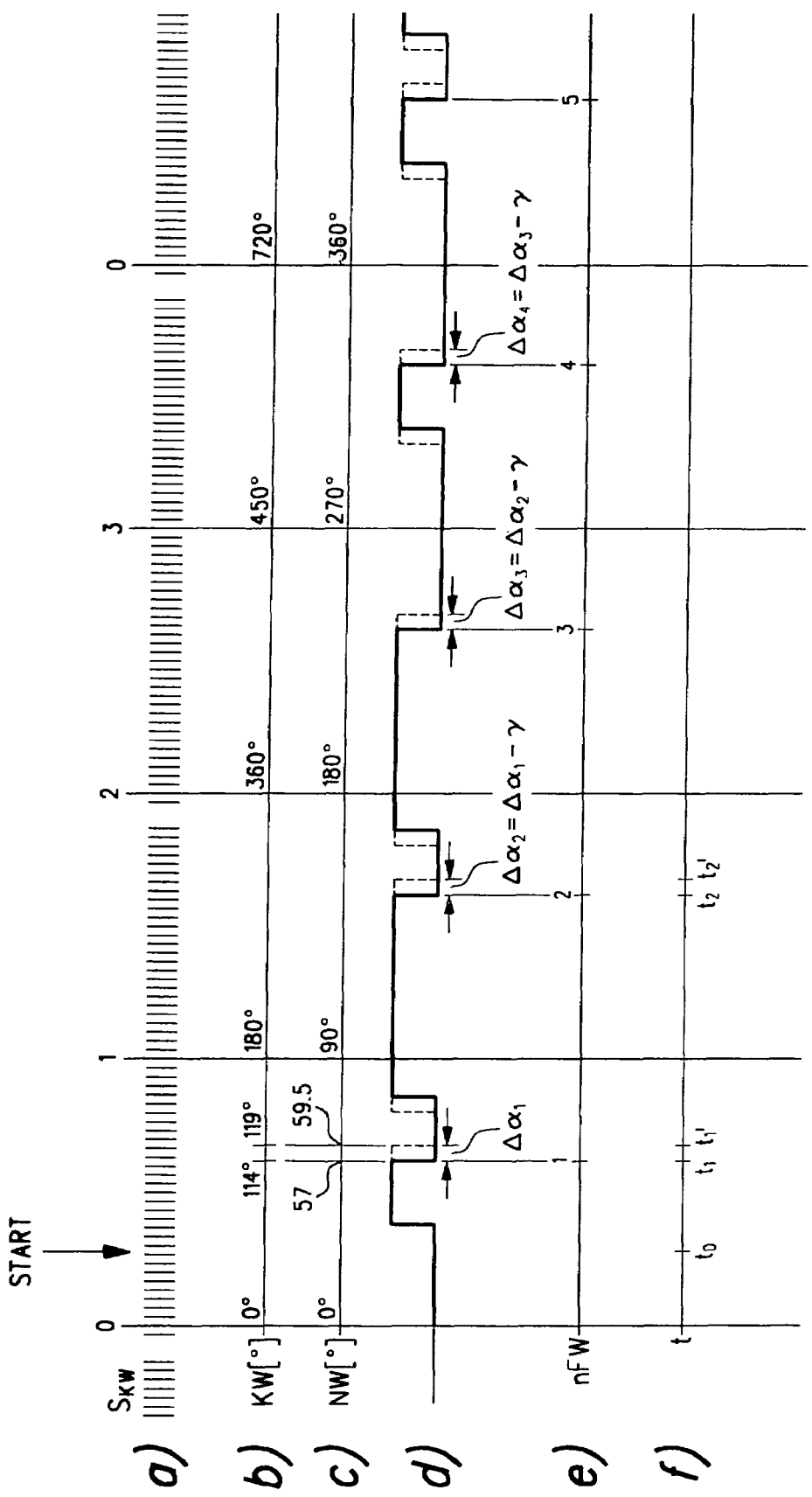
FIG. 2 shows control signals and signals registered by sensors during the starting phase of the internal combustion engine plotted against time.

FIG. 2 shows a plot of the signals supplied by sensors 22 and 23 and already preprocessed to form square-wave signals, which are evaluated in engine control unit 24, against the crankshaft angle (line b) of FIG. 2) and against the camshaft angle (line c) of FIG. 2) and against time t (line f) of FIG. 2). In this context, the camshaft is driven by the crankshaft at half the rotary speed of the crankshaft.

Going into detail, line a) of FIG. 2 shows a plot of crankshaft signal $S_{KW}$ supplied by crankshaft sensor 22 and preprocessed. The number of angle marks is 60-2; the two missing angle marks form reference mark 13. Since a working cycle of the internal combustion engine extends over two crankshaft revolutions, using the selected system, two times 60-2 pulses have to be generated by the crankshaft signal-generating sensor over one working cycle.

Line b) of FIG. 2 shows the rotary angle of the crankshaft over one working cycle, that is, from 0 to 720°.

Line c) of FIG. 2 shows the angle of rotation of the camshaft, which, within one working cycle lies in the range of 0 to 360°.

In line d) of FIG. 2 the signal curve of the camshaft $S_{NW}$ is shown for a 4-cylinder internal combustion engine. Signal-generating wheel 14 of camshaft 15 provides two different segments 17, 18, which lead to different low and high phases in the signal. Since both the crankshaft signal and the camshaft signal are evaluated, same segments may be distinguished by the present or non-present reference mark 13 in signal-generating wheel 10 of crankshaft 11.

Line e) of FIG. 2 shows the edge changes nFW resulting from negative edges 21 at signal-generating wheel 14 of camshaft 15 over one working cycle. In total, per working cycle, four edge changes come about which have an equidistant angle distance of 90° from each other in each case.

When the internal combustion engine is started for the first time, at first an inaccurate signal $S_{NW}$ is emitted at the camshaft, particularly based on a varying air gap between phase sensor 23 and segments 16, 17 that is conditioned upon installation. During startup of the internal combustion engine, the startup signal position of the phase signal to the crankshaft signal is adjusted to a normal signal position, via a calibrating procedure of at most sixty-four edges of phase-generating wheel 14, that is, altogether over at most eight working cycles in the case of a 4-cylinder engine. The adjustment is made by changing the switching threshold of the phase sensor during the recording of the edge change.

Figure 5:
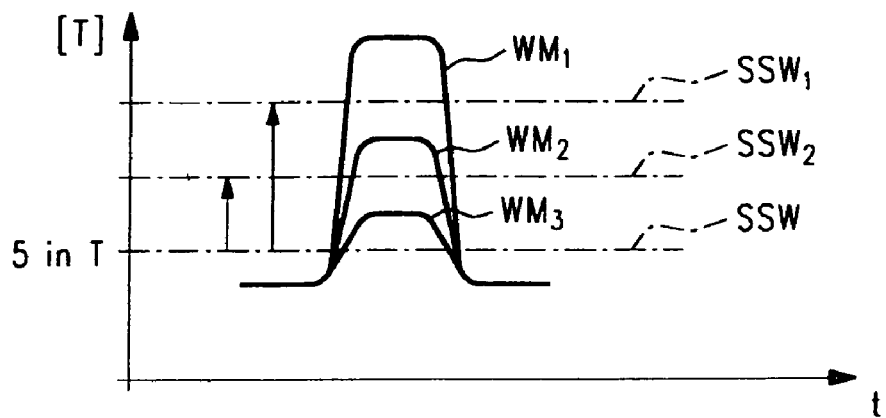
FIG. 5 shows an analog input of a phase sensor.

Such a change in the switching threshold is shown, for example, in FIG. 5. The analog input signal of the phase sensor is plotted in Tesla against the time axis. As the angle marks pass the phase sensor, depending on the size of the air gap between the phase sensor and the angle mark, a different angle mark signal WM results. FIG. 5 shows, for example, three different sized angle mark signals WM1, WM2 and WM3. The comparatively strong signal WM1 results from a comparatively slight air gap. In the case of signal WM2, the air gap is greater. In signal WM3 the air gap is still greater; accordingly, this signal is the weakest. In order to ensure in each case a switching of the sensor based on the detected signal, switching threshold SSW of the phase sensor is set comparatively low, a typical value is ca. 5 mTesla above the signal offset.

In order to obtain an optimal and representative switching point in time, preset switching threshold SSW is shifted, in a step by step manner, by the phase sensor to a value of ca. 70% of the maximum detected signal. According to FIG. 5, in the case of a signal WM1, a shifting of preset switching threshold SSW takes place to switching threshold SSW1 that is optimal for this signal MW1. In response to an input signal WM2, there is a shifting of preset switching threshold SSW to the value of nominal switching threshold SSW2.

The adjustment of the preset value SSW to the respective values SSW1, 2, . . . , that are particularly air-gap dependent, takes place as a function of the calibrating behavior of the phase sensor in small steps about angular values (adjustment values) $\chi$, until the provided switching threshold has been reached. Then the normal signal position of the camshaft signal with respect to the crankshaft signal is present. The specification of the adjustment step width, in this connection, is defined by the admissible switching level shift. From this, then, there results an adjustment step width based on the angle, as a function of the respective LS.

The adjustment is made under certain boundary conditions, for example, camshaft adjustment in retarded position. Before the adjustment, a temperature correction may be made based on characteristic curves stored in the control unit.

Line d) of FIG. 2 shows the normal signal position of the signal $S_{NW}$ at the camshaft as a solid line. The dotted line shows the startup signal position which has, for example, an angle deviation of $\Delta\alpha$ of $2.5°$ at the camshaft at the first edge change nFW=1 from the normal signal position, based on an air gap being present. That means that, at the edge change nFW=1, the edge deviates in the startup signal position by $2.5°$ from the normal signal position.

Line f) of FIG. 2 represents time axis t. The internal combustion engine is started, for example, at point in time $t_0$. At point in time $t_1'$, the phase sensor detects a negative edge change, while taking into consideration an angle error $\Delta\alpha$.

Figure 6:
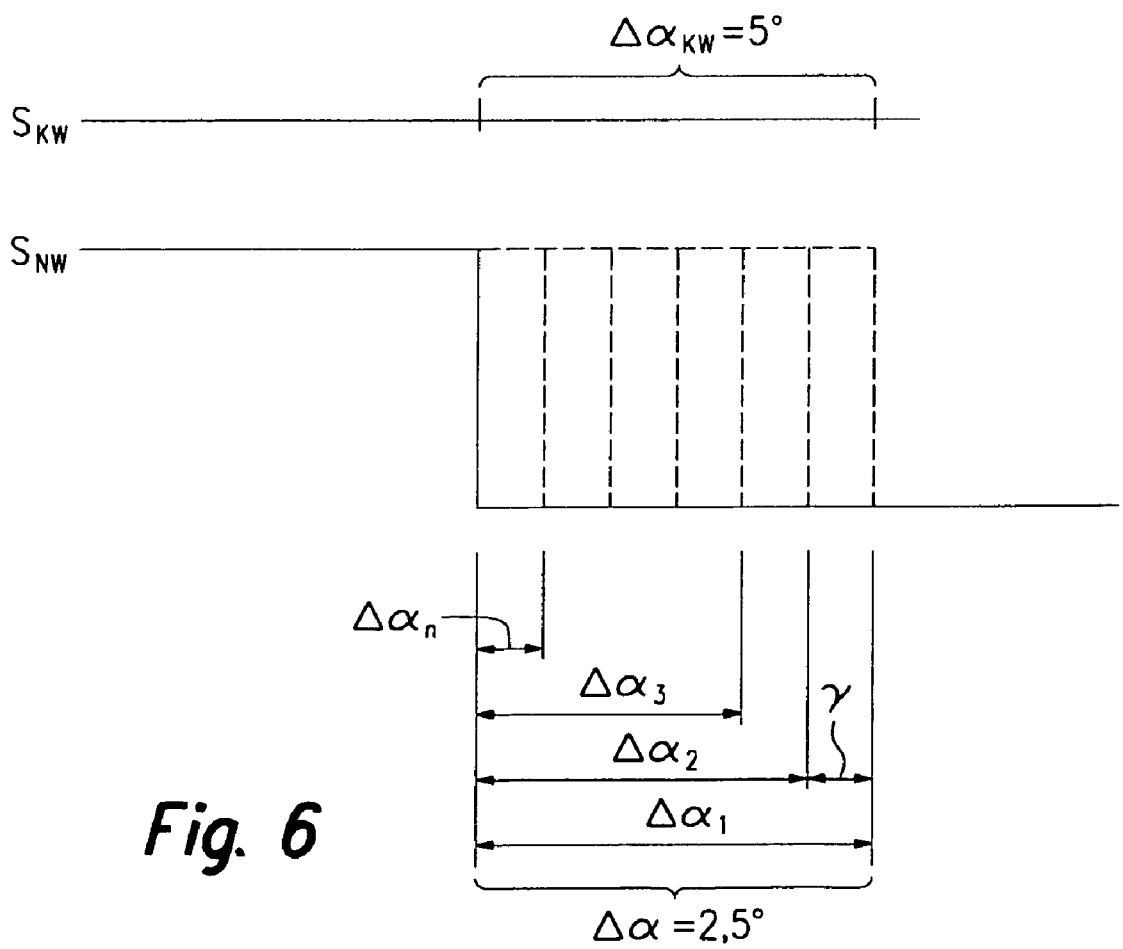
FIG. 6 illustrates the stepwise adjustment of the camshaft signal over several edge changes.

FIG. 6 shows the adjustment of the camshaft signal in the calibrating phase over several negative edge changes. At each edge change the camshaft signal $S_{NW}$ is shifted by the value $\chi$, until the optimal switching threshold of the phase sensor, and thus the normal signal position, is reached.

Figure 3:
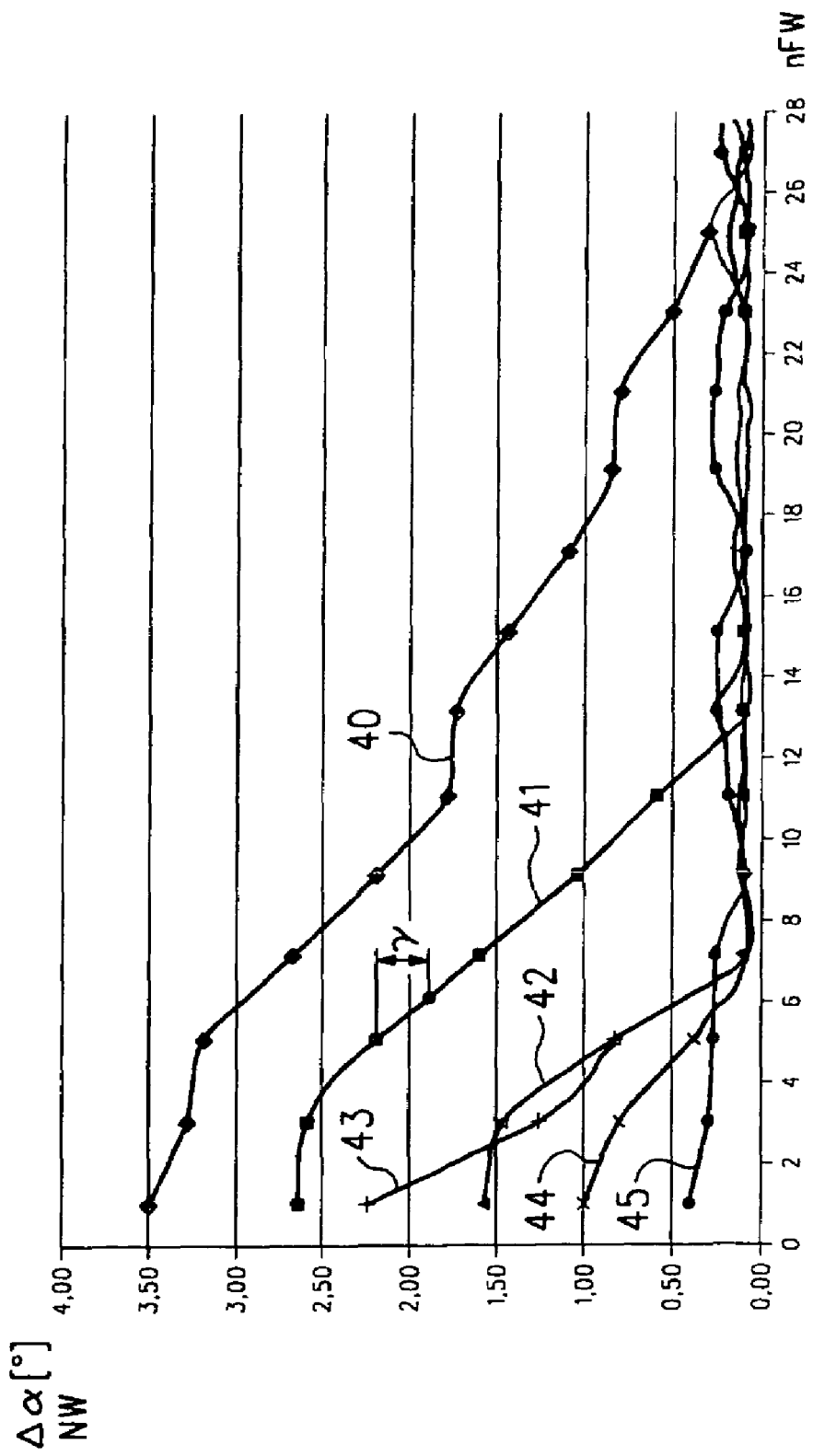
FIG. 3 is a graph illustrating adjustment of the difference of the startup signal position from the normal signal position plotted over several edge changes upon the first switching on of the phase sensor or of the internal combustion engine, as a function of the air gap between the signal-generating wheel and the phase sensor.

In FIG. 3 there is plotted the calibrating behavior of the phase sensor about angle error $\Delta\alpha$ from the startup signal position deviating from the normal signal position against a number of edge changes nFW in the calibrating phase. Based on the sensor calibration, the startup signal position is adjusted at each edge change, in a step-wise manner, by a value $\chi$, until, in the last analysis, the normal signal position is reached.

As was mentioned before, the difference of the startup signal position from the normal signal position, and thereby the angle error $\Delta\alpha$ that is to be adjusted, depends on the size of the air gap between the phase signal-generating wheel and the phase sensor of the camshaft. In FIG. 3, altogether six adjustment curves of the angle errors $\Delta\alpha$ for various large air gaps are plotted, for example. The curve along line 40 comes about in response to an air gap of 0.1 mm; the curve of line 41 in response to an air gap of 0.8 mm; the curve of line 42 in response to an air gap of 1.5 mm; the curve of line 43 in response to an air gap of 2.2 mm; the curve of line 44 in response to an air gap of 2.0 mm; the curve of line 45 in response to an air gap of 1.8 mm.

If the overall angle error to be adjusted, $\Delta\alpha_1$, at the camshaft amounts to, for instance, $2.5°$ ($=5°$ at the crankshaft) at nFW=1, there comes about an adjustment of the angle error over altogether approximately 13 edge changes along line 41.

Figure 4:
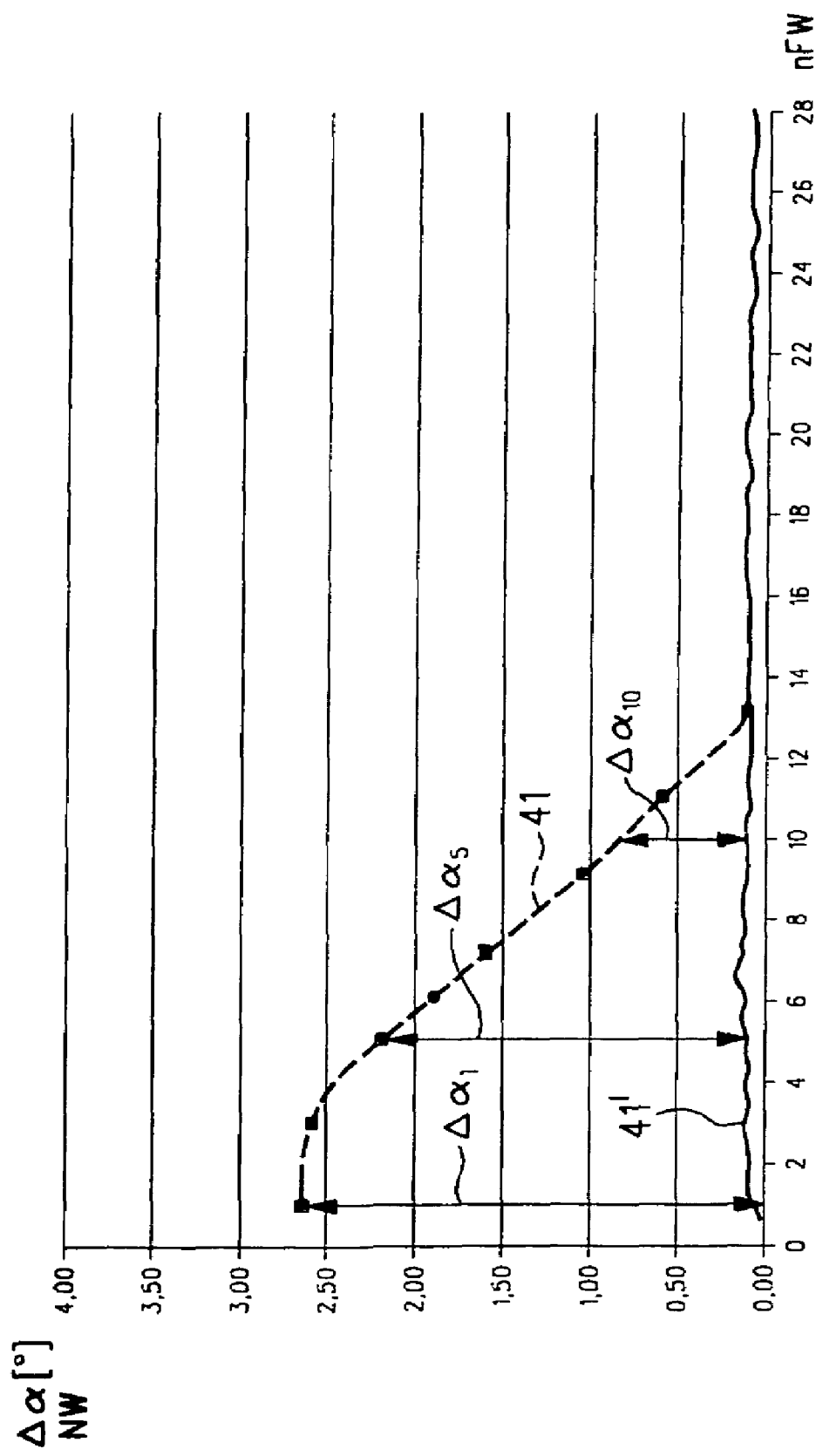
FIG. 4 is a graph illustrating correcting of the phase signal by the correcting values upon renewed switching on of the phase sensor or the internal combustion engine.

FIG. 4 shows the angle errors $\Delta\alpha_1$ at nFW=1, $\Delta\alpha_5$ at nFW=5 and $\Delta\alpha_{10}$ at nFW=10 for the curve along line 41 from FIG. 3, as an example. In order to compensate for an angle error of $2.5°$ resulting from an air gap of 0.8 mm at the camshaft, according to line 41, altogether 13 edge changes are required. Based on the calibration, between each edge change the phase signal is adjusted by the maximum adjustment value $\chi=0.25°$, until finally the normal signal position of the phase signal is reached after thirteen edge changes. The values of the individual angle errors $\Delta\alpha$ may be seen in FIG. 7.

The adjustment curve along line 41 according to FIGS. 3 and 4 applies to the first switching on of the phase sensor and/or of the internal combustion engine. Switching on may then be present: at the first starting of the internal combustion engine, at turned-off nonvolatile memory, at installation or exchange of the phase sensor, at exchanged engine control, at the resetting of all functions in the engine control.

According to the present invention, it is provided that correcting values based on the angle errors, that is, especially the values of angle errors $\Delta\alpha_1$ at nFW=1, or corrected angle errors $\Delta\alpha_2$ at nFW=2; $\Delta\alpha_3$ at nFW=3; up to $\Delta\alpha_n$ at nFW=n are stored as correcting values KOW in a nonvolatile memory, which may also be seen in FIG. 7.

According to FIG. 1, the nonadjusted angle at startup at the camshaft amounts to NW=59.5°. In the normal signal position after the calibration, NW=57°. The adjustment in the calibrating phase thus takes place from a camshaft angle of NW=59.5° at nFW=1 to a calibrated camshaft angle NW=57° at nFW=13. Altogether there comes about an angle error of $\Delta\alpha_1=2.5°$ at nFW=1, according to FIG. 4. The corresponding situation is reproduced in FIG. 7.

After the close of the calibrating phase and arrival at the normal signal position, angle errors $\Delta\alpha_1$ to $\Delta\alpha_{13}$ may then be determined by the comparison of the startup signal position with the normal signal position at the respective edge changes nFW. Corresponding values may be seen in FIG. 7. The appertaining correcting values KOW which, according to a first example embodiment of the present invention, correspond to angle errors $\Delta\alpha_1$ to $\Delta\alpha_{13}$, are stored in the nonvolatile memory.

Upon a renewed switching on of the phase sensor and/or of the internal combustion engine, the phase signals are then adjusted not only by the adjustment values $\chi$, but in addition by correcting values KOW, that are stored in the memory, in such a way that, after the renewed switching on of the phase sensor and/or the internal combustion engine, an improved phase signal is available, and especially after the renewed switching on, the normal signal position is at least largely achieved.

In the example shown in FIGS. 1, 4 and 7, the corrected camshaft angle at renewed switching on of the internal combustion engine then amounts to $NW_{KOR}=57°$, and this is true at all edge changes from the beginning of the calibrating phase to its end. Then there comes about angle error curve 41' shown in FIG. 4, in which an angle error ideally of 0° is present. From this one may obtain a very accurate position of the camshaft, after the start of the internal combustion engine and after switching on the phase sensor. Overall, this leads to favorable exhaust gas values during the start of the internal combustion engine.

The thus adjusted and corrected startup signal position of the phase signal to the crankshaft signal is compared to the normal signal position during the repeatedly renewed starting. A new correction may be carried out in response to deviations of the corrected startup signal position from the normal signal position to be expected. The new correcting values resulting from this may be drawn upon in the case of a once again renewed starting of the internal combustion engine, for the correction of the correcting values ascertained during the previous starting. Because of this, there comes about in each case an improved, corrected startup phase signal in response to several renewed starting procedures. The correction of the phase signal is accordingly improved and learned by multiple repetition of the adjustment and correction during renewed switching on; in particular, a moving average formation is carried out.

All in all, because of the nonvolatile storage of the correcting values, the systematic angle errors at renewed starting may be excluded.

In order to save space in the nonvolatile memory, according to a second example embodiment of the present invention, the correction may take place by using the correcting values characteristic of the angle errors. This may be done in particular in that the correcting values are portrayed by a straight line that approximates the angle errors. In response to the occurrence of an angle error of 2.5°, the straight line then corresponds to signal curve 41 in FIG. 3, between edge changes two and twelve. The straight line may, in this instance, be computed by a linear regression or by two selected points. Therewith, it may be sufficient to keep only the selected values in the nonvolatile memory, and not fourteen or more individual correcting values KOW.

For the plausibility check of the values, additional mechanisms may be used, for instance, top or bottom limits for the values may be used. Besides that, an averaging may be performed of several, e.g., three, straight lines from corresponding three adjustment procedures.

What is claimed is:

1. A method for providing an improved phase signal of an active phase sensor of a camshaft of an internal combustion engine, comprising:

immediately after switching on at least one of the phase sensor and the internal combustion engine, scanning angle marks of a first signal-generating wheel that is connected torsionally fixed to the camshaft, using the phase sensor;

performing a calibration procedure of the phase sensor during the switching on of the internal combustion engine; and scanning angle marks of a second signal-generating wheel that is connected torsionally fixed to a crankshaft of the internal combustion engine, using a crankshaft sensor;

wherein:
   a) after an initial switching on of the phase sensor:
      a. 1) ascertaining a start-up signal position of the phase signal during the calibration procedure of the phase sensor, based on a crankshaft signal over a plurality of angle marks of the first signal-generating wheel connected to the camshaft, wherein during the calibration procedure of the phase sensor, the phase signal is corrected stepwise by adjustment values until a normal signal position is achieved;
      a.2) ascertaining the normal signal position of the phase signal based on the crankshaft signal after the switching on of the internal combustion engine and after a concluded calibration procedure of the phase sensor;
      a.3) determining angle errors from a difference between the start-up signal position and the normal signal position; and
      a.4) storing in a nonvolatile memory correcting values that are based on the angle errors; and
   b) during a subsequent renewed switching on of at least one of the phase sensor and the internal combustion engine, correcting the phase signal during the calibration procedure by the correcting values, whereby, after the renewed switching on of the phase sensor, an improved phase signal is provided.

2. The method as recited in claim 1, wherein the correcting values are formed from a maximum angle error at the first scanned angle mark and from additional angle errors, corrected by the adjustment values, at additional scanned angle marks.

3. The method as recited in claim 1, wherein the switching on of the internal combustion engine takes place over a plurality of working cycles of the internal combustion engine, and the calibration procedure is terminated completely after a maximum of 8 working cycles.

4. The method as recited in claim 1, wherein the stepwise correction of the phase signal in step a. 1) is limited to a maximum adjustment value in the range between ±2° and ±0.1°.

5. The method as recited in claim 1, wherein the correcting values are stored in at least one of a nonvolatile memory of an engine control unit of the internal combustion engine and a nonvolatile memory of the phase sensor.

6. The method as recited in claim 1, wherein at least one of the correcting of the phase signal by the adjustment values in step a.1) and the correcting of the phase signal by the correcting values in step b) takes place under specified conditions of the camshaft.

7. The method as recited in claim 1, wherein based on a) the known characteristic behavior of the phase sensor at different air gaps, and b) one of the determined angle errors and the correcting values, at least one of an influence of air gap dependence and the size of an air gap between the phase sensor and the angle marks is ascertained, and based on at least one of the ascertained influence of air gap dependence and the size of the air gap between the phase sensor and the angle marks, at least one of corresponding diagnosis function and correcting function is set.

8. The method as recited in claim 1, wherein the correcting of the phase signal according to step b) is performed in such a way that, during the calibration procedure, the corrected phase signal based on the crankshaft signal yields a corrected start-up signal position that is substantially equivalent to the normal signal position.

9. The method as recited in claim 8, wherein during multiple renewed switching on of at least one of the phase sensor and the internal combustion engine, the corrected start-up signal position is compared to a start-up signal position to be expected based on the stored correcting values, and wherein a moving average of correcting values to be stored according to step a.4) is formed.

10. The method as recited in claim 8, wherein the correcting values are defined by straight lines that approximate the angle errors.

11. The method as recited in claim 8, wherein the phase sensor includes at least one of a Hall sensor and a magnetoresistive sensor.

12. The method as recited in claim 8, wherein the normal signal position according to step a. 1) is reached when a calibrating phase running in the phase sensor has terminated.

13. The method as recited in claim 12, wherein in the phase sensor, during the calibration procedure, a switching threshold is corrected as a function of a signal recorded in such a way that the switching threshold lies at a selected percentage of a maximum signal level swing of the signal recorded by the phase sensor.

14. A system comprising:
   a camshaft of an internal combustion engine
   a phase sensor that performs a calibration procedure during each switching on of at least one of the internal combustion engine and the phase sensor, wherein, during the calibration procedure, a phase signal of the phase sensor is corrected stepwise by adjustment values until a normal signal position of the phase signal is achieved;
   a first signal-generating wheel that is connected to the camshaft in a torsionally fixed manner, wherein the phase sensor scans angle marks of the signal-generating wheel immediately after switching on at least one of the phase sensor and the internal combustion engine;

a second signal-generating wheel that is connected to a crankshaft of the internal combustion engine in a torsionally fixed manner;

a crankshaft sensor that scans angle marks of the second signal-generating wheel;

an engine control unit that processes signals of the phase sensor and signals of the crankshaft sensor, wherein the processing of the signals includes, after an initial switching on of the phase sensor:

ascertaining a staff-up signal position of the phase signal during the calibration procedure based on a crankshaft signal over a plurality of angle marks of the first signal-generating wheel;

ascertaining the normal position of the phase signal based on the crankshaft signal after the switching on of the internal combustion engine and after a concluded calibration procedure of the phase sensor;

determining angle errors from a difference between the staff-up signal position and the normal signal position; and determining correcting values based on the angle errors; and a nonvolatile memory for storing the correcting values, wherein, during the calibration procedure of a subsequent renewed switching on of at least one of the phase sensor and the internal combustion engine, the phase signal is corrected by the correcting values.

15. The system as recited in claim 14, wherein the nonvolatile memory is one of an EEPROM and a flash memory.

16. The system as recited in claim 14, wherein the nonvolatile memory is situated in the engine control unit.

17. The system as recited in claim 14, wherein characteristic curves of the correcting values are stored in the nonvolatile memory.

18. A computer-readable data storage medium storing a computer program that, when executed by a computer, performs a method for providing an improved phase signal of an active phase sensor of a camshaft of an internal combustion engine, the method comprising:

immediately after switching on at least one of the phase sensor and the internal combustion engine, scanning angle marks of a first signal-generating wheel that is connected torsionally fixed to the camshaft, using the phase sensor;

performing a calibration procedure of the phase sensor during the switching on of the internal combustion engine; and scanning angle marks of a second signal-generating wheel that is connected torsionally fixed to a crankshaft of the internal combustion engine, using a crankshaft sensor;

wherein:

a) after an initial switching on of the phase sensor:

a.1) ascertaining a start-up signal position of the phase signal during the calibration procedure of the phase sensor, based on a crankshaft signal over a plurality of angle marks of the first signal-generating wheel connected to the camshaft, wherein during the calibration procedure of the phase sensor, the phase signal is corrected stepwise by adjustment values until a normal signal position is achieved;

a.2) ascertaining the normal signal position of the phase signal based on the crankshaft signal after the switching on of the internal combustion engine and after a concluded calibration procedure of the phase sensor;

a.3) determining angle errors from a difference between the start-up signal position and the normal signal position; and a.4) storing in a nonvolatile memory correcting values that are based on the angle errors; and b) during a subsequent renewed switching on of at least one of the phase sensor and the internal combustion engine, correcting the phase signal during the calibration procedure by the correcting values, whereby, after the renewed switching on of the phase sensor, an improved phase signal is provided.

19. The computer-readable data storage medium as recited in claim 18, wherein the correcting of the phase signal according to step b) is performed in such a way that, during the calibration procedure, the corrected phase signal based on the crankshaft signal yields a corrected staff-up signal position that is substantially equivalent to the normal signal position.

20. The computer-readable data storage medium as recited in claim 19, wherein the normal signal position according to step a.1) is reached when a calibrating phase running in the phase sensor has terminated.

* * * * *

UNITED STATES PATENT AND TRADEMARK OFFICE
CERTIFICATE OF CORRECTION

PATENT NO. : 7,661,297 B2 Page 1 of 1
APPLICATION NO. : 11/597803
DATED : February 16, 2010
INVENTOR(S) : Steinruecken et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 7 days.

Signed and Sealed this

Thirtieth Day of November, 2010

David J. Kappos
*Director of the United States Patent and Trademark Office*